United States Patent
Douglas et al.

(10) Patent No.: US 9,999,317 B2
(45) Date of Patent: Jun. 19, 2018

(54) DESCALING DEVICE FOR A BEVERAGE MACHINE AND METHOD OF DESCALING A BEVERAGE MACHINE

(71) Applicant: Thomas Jerige, Norwalk, CT (US)

(72) Inventors: Shaun Douglas, Southfield, MA (US); Jules Aspesi, New Canaan, CT (US); Thomas Jerige, Norwalk, CT (US); Edward Douglas, New Canaan, CT (US)

( * ) Notice: Subject to any disclaimer, the term of this patent is extended or adjusted under 35 U.S.C. 154(b) by 0 days. days.

(21) Appl. No.: 15/809,057

(22) Filed: Nov. 10, 2017

(65) Prior Publication Data

US 2018/0125289 A1 May 10, 2018

Related U.S. Application Data

(63) Continuation of application No. 15/333,764, filed on Oct. 25, 2016, which is a continuation-in-part of application No. 15/085,617, filed on Mar. 30, 2016, now Pat. No. 9,622,616.

(51) Int. Cl.
*A47J 31/60* (2006.01)
*B08B 3/08* (2006.01)

(52) U.S. Cl.
CPC ............... *A47J 31/60* (2013.01); *B08B 3/08* (2013.01)

(58) Field of Classification Search
None
See application file for complete search history.

(56) References Cited

U.S. PATENT DOCUMENTS

| | | | |
|---|---|---|---|
| 5,173,125 A | 12/1992 | Felding |
| 5,325,765 A | 7/1994 | Sylvan et al. |
| 5,472,719 A | 12/1995 | Favre |
| 5,840,189 A | 11/1998 | Sylvan et al. |
| 6,645,537 B2 | 11/2003 | Sweeney et al. |
| 6,998,379 B1 | 2/2006 | Costagliola |
| 8,216,385 B2 | 7/2012 | Dick et al. |

(Continued)

FOREIGN PATENT DOCUMENTS

| | | |
|---|---|---|
| WO | 2013087474 A1 | 6/2013 |
| WO | 2013166615 A1 | 11/2013 |

(Continued)

OTHER PUBLICATIONS

English Machine Translation of WO 2013166615 A1.*

(Continued)

*Primary Examiner* — Nicole Blan
(74) *Attorney, Agent, or Firm* — Cantor Colburn LLP

(57) ABSTRACT

A device for descaling flow passages of a pod-type beverage machine, comprising: a container having a bottom wall and a sidewall extending from the bottom wall, the sidewall defining an opening at a top of the container, wherein the container is configured to be received by the beverage machine; a dry, liquid-absorbing material disposed within the container adjacent to the bottom wall, and configured to retard a flow of liquid therethrough; a dry powder descaler disposed within the container, wherein at least a portion of the dry powder descaler is disposed on a surface of the absorbing material opposite the bottom wall; and a cover over the opening at the top of the container and configured to seal the liquid-absorbing material and the dry powder descaler in the container.

20 Claims, 1 Drawing Sheet

(56) References Cited

U.S. PATENT DOCUMENTS

| | | |
|---|---|---|
| 8,382,907 B2 | 2/2013 | Dick et al. |
| 8,573,115 B2 | 11/2013 | Lai et al. |
| 8,646,379 B2 | 2/2014 | Lai et al. |
| 8,950,315 B2 | 2/2015 | Lai et al. |
| 8,978,541 B2 | 3/2015 | Lai et al. |
| 9,066,623 B2 | 6/2015 | Lai et al. |
| 9,155,418 B2 | 10/2015 | Lai et al. |
| 9,486,108 B1 | 11/2016 | Douglas et al. |
| 2005/0051478 A1 | 3/2005 | Karanikos et al. |
| 2014/0261563 A1* | 9/2014 | Gorra .................. C11D 7/44 |
| | | 134/25.2 |
| 2014/0345652 A1* | 11/2014 | Meng .................. A47J 31/60 |
| | | 134/22.18 |
| 2015/0090300 A1* | 4/2015 | Dyer .................. H01L 21/0271 |
| | | 134/22.18 |
| 2016/0022088 A1 | 1/2016 | Dick |

FOREIGN PATENT DOCUMENTS

| | | | |
|---|---|---|---|
| WO | WO-2013166615 A1 * | 11/2013 | .............. A47J 31/60 |
| WO | 2013188246 A2 | 12/2013 | |
| WO | 2015081145 A1 | 6/2015 | |

OTHER PUBLICATIONS

International Search Report dated Jun. 5, 2017; International Application No. PCT/US2017/024283; International Filing Date Mar. 27, 2017 (8 pages).

Written Opinion dated Jun. 5, 2017; International Application No. PCT/US2017/024283; International Filing Date Mar. 27, 2017 (6 pages).

* cited by examiner

DESCALING DEVICE FOR A BEVERAGE MACHINE AND METHOD OF DESCALING A BEVERAGE MACHINE

CROSS REFERENCE TO RELATED APPLICATION

The present application is a continuation of U.S. Non-Provisional application Ser. No. 15/333,764 filed on Oct. 25, 2016, which is a continuation-in-part of U.S. Non-Provisional application Ser. No. 15/085,617, filed on Mar. 30, 2016, the content of which is incorporated herein by reference in its entirety.

FIELD OF THE INVENTION

This disclosure relates to a device and method for descaling and cleaning a flow passage of a pod-type beverage machine and, more particularly, to a pod for a pod-type beverage brewing machine for descaling the beverage machine.

BACKGROUND

Single brew beverage machines have become a popular method of preparing drinks such as coffee, tea, hot chocolate, and other drinks (e.g. soda) on demand. More recently, single brew beverage machines have been expanded beyond drink preparation and now are being used to prepare food items such as soup and other products that utilize hot water in their preparation. Beverage machines which utilize cold water are also being developed.

For single brew beverage machines, a sealed plastic container or pod is provided. The pod is essentially a plastic cup with an open top and a foil seal closing the open top of the cup. The pod contains a food or drink product, most often in dry form, and the pod may also contain a filter. For example, if the pod is a coffee pod it will contain coffee grounds and a filter basket sealed within the plastic cup by the foil seal. In order to brew the coffee, the pod is placed into a brewing machine that includes a receptacle sized and shaped to receive the pods. After the pod is placed in the receptacle, the user can initiate a brewing cycle operation of the brew machine. During the brewing process, two needles pierce the pod. One needle pierces the top of the pod through the foil seal to introduce hot water into the pod and the other needle pierces the bottom of the pod to provide a drainage path for the prepared beverage. As the top needle introduces hot water into the pod, it interacts with the coffee grinds to brew the coffee. Filter material is suspended within the pod to provide a brew basket that allows the brewed coffee to pass quickly through the filter while preventing the coffee grounds from exiting through the bottom hole in the pod. Accordingly, a cup of coffee can be quickly and conveniently brewed. Once the brewing is complete, the pod can be removed from the machine and discarded.

There are currently several brewing machine and pod systems available on the market that have corresponding pods and receptacles of different shapes and sizes. Although these pods may vary in terms of shape, size, and construction, they each include a self-contained pod that includes a pre-portioned amount of brewing ingredients to brew a desired food or beverage. The pods are designed so that they can be punctured to allow water to enter the pod and interact with the brewing ingredients to brew a beverage, and then exit from the pod to provide the beverage.

Pod brewing systems provide many advantages over traditional brewing methods, such as eliminating the need to separately purchase, measure, and add brewing ingredients (e.g., coffee grounds) to a brewing machine. The pods provide ingredients in the correct proportions to brew a desired beverage in a convenient, single use, sealed container. Moreover, once brewing is complete, the entire pod can be removed from the machine and discarded, eliminating the need to directly handle used filters and brewing ingredients.

However, one drawback of pod brewing systems is the need to clean the brewing machine itself, including cleaning and descaling the water injection needles, especially if food items are being prepared using the machine. Cleaning of the brewing machine includes the purchase of separate cleaning ingredients, applying the correct amount of cleaning ingredients, and manually cleaning the needles. As a result, flushing the system after cleaning is often desirable to remove residual harmful descaling/cleaning products. This presents an inconvenience to the user, especially when one of the biggest advantages of a pod brewing system is convenience. Other methods of cleaning the brewing machine exist, such as adding cleaning solution to the water supply (e.g. in the reservoir) of the brewing machine or providing a pod that contains chemical cleaners. However, these systems are inadequate because the cleaning solution fails to reach all the parts of the brewing machine that are in need of cleaning and/or the cleaning solution is flushed out of the system too quickly in order to effectively clean. Disclosed is a product and method to addresses these and other limitations associated with alternative methods of cleaning.

SUMMARY

Disclosed is a device for descaling flow passages of a pod-type beverage machine including: a container having a bottom wall and a sidewall extending from the bottom wall, the sidewall defining an opening at a top of the container, wherein the container is configured to be received by the beverage machine; an absorbent material disposed within the container and adjacent to the bottom wall; a descaler disposed within the container, wherein at least a portion of the descaler is disposed on a surface of the absorbing material opposite the bottom wall; and a cover over the opening at the top of the container and configured to seal the absorbent material and the descaler in the container.

Also disclosed is a method of descaling flow passages of a pod beverage machine, the method including: providing a descaling pod, including: a container having a bottom wall and a sidewall extending from the bottom wall, the sidewall defining an opening at a top of the container, wherein the container is configured to be received by the beverage machine; an absorbent material disposed within the container adjacent to the bottom wall, wherein the absorbent material is configured to retard the flow of water therethrough; a descaler disposed within the container, wherein at least a portion of the descaler is disposed on a surface of the absorbing material opposite the bottom wall; and a cover over the opening of the container; inserting the descaling pod into the beverage machine comprising a first needle and a second needle, and causing the first needle to pierce the cover of the descaling pod and the second needle to pierce the bottom wall of the descaling pod; activating the beverage machine, wherein the activation causes water to be injected into the pod through the first needle; dissolving the descaler in the water to form a descaling solution, wherein at least a portion of the descaling solution is absorbed by the absorbent material; and descaling the first needle and the second needle.

These and other aspects, features, and advantages of the disclosed embodiments will become better understood with reference to the following description and appended claims.

DETAILED DESCRIPTION

Figure 2:
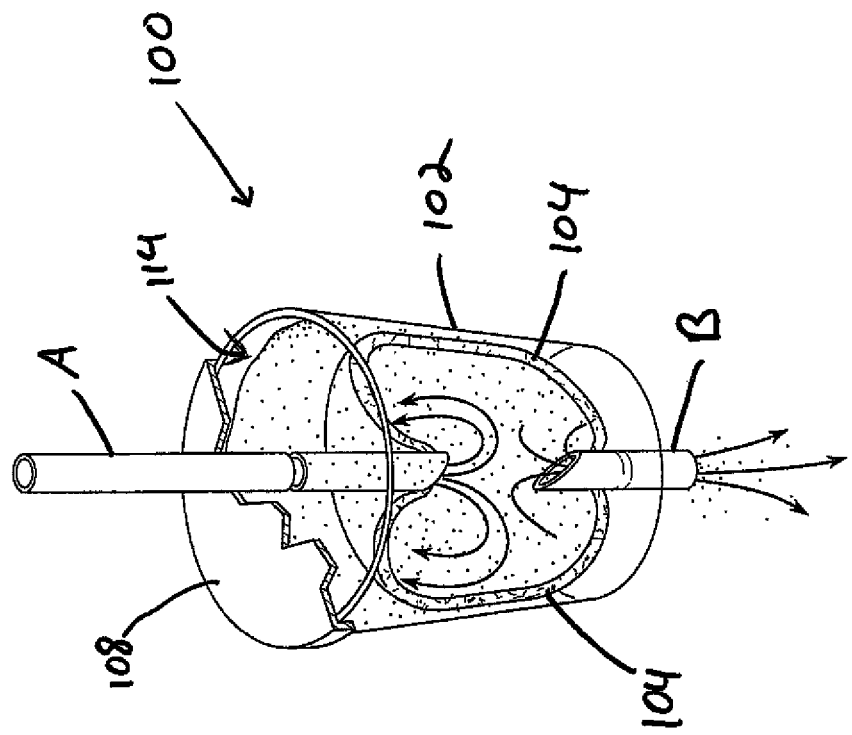
FIG. 2 illustrates the cleaning container of FIG. 1 with the outer walls shown as translucent for purposes of illustration.
Figure 1:
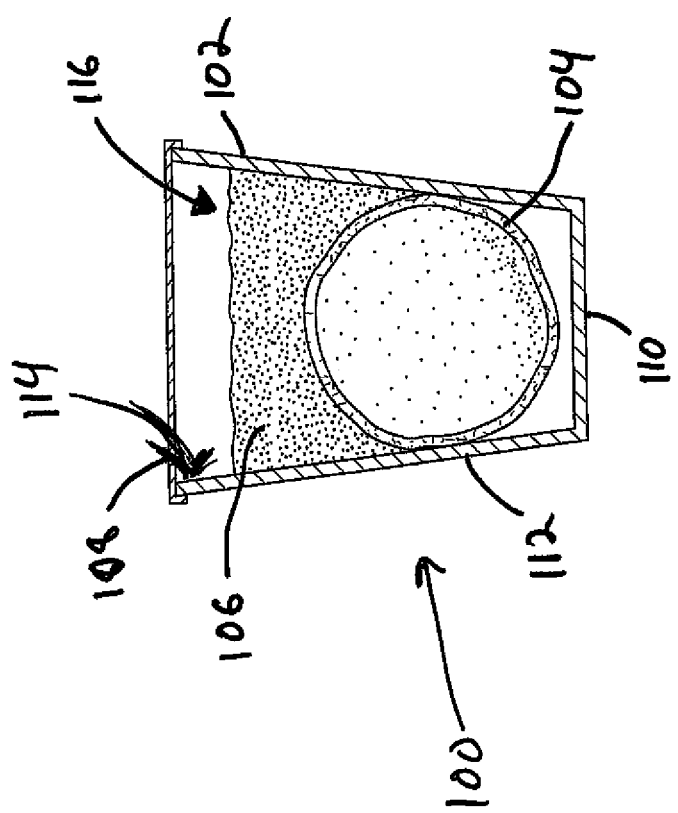
FIG. 1 illustrates a cleaning container shown in cross-section in accordance with an embodiment.

Disclosed is a device for descaling and/or cleaning flow passages of a pod-type beverage machine. The device comprises a container having a bottom wall and a sidewall extending from the bottom wall, the sidewall defining an opening at a top of the container. The container is configured to be received by the beverage machine. A liquid-absorbing material is disposed within the container adjacent to the bottom wall, and is configured to retard the flow of liquid through the container. Also included in the container is a descaler. The descaler can be a liquid descaler or a dry powder descaler. At least a portion of the descaler is disposed on a surface of the absorbing material opposite the bottom wall. A cover over the opening at the top of the container seals the liquid-absorbing material and the descaler in the container. Referring to FIGS. 1 and 2, an example of a cleaning pod 100 for cleaning and/or descaling a beverage brewing machine is shown. The cleaning pod 100 includes a container 102, a liquid absorbing material 104, a descaler 106, and a cover 108.

The container 102 has a bottom wall 110, a sidewall 112 that extends around the periphery of the bottom wall 110, and an open top 114 defined by the sidewall 112. The container 102 is generally cup-shaped and defines an interior space 116. However, the size and shape of the container are not limited, and can be modified as desired so that the pod is capable of being received by the beverage machine. The walls of the container 102 can be made from a liquid impermeable material, such as metal foil or a polymeric film. Representative polymers include thermoplastic polymers such as polypropylene, polyethylene, polystyrene, polyamide, or a combination thereof. Representative metal foils include aluminum, copper, or tin foil. Alternatively, the container walls can be made from a degradable material such as compressed cardboard, paper, or other cellulosic material, or a biodegradable polymer material, such as polylactic acid, degradable polyethylene, degradable polystyrene, degradable polypropylene, or a combination thereof. Optionally, the container walls can further comprise a water resistant coating to resist degradation from contact with hot water during the brewing cycle. Representative examples of water resistant coatings include wax, shellac, aluminum foil, a polymeric material, or a combination thereof. A combination comprising at least one of the foregoing can also be used.

The liquid absorbing material 104 is disposed within the interior space 116 of the container 102. The liquid absorbing material 104 can be sized and shaped so that it extends across the internal diameter of the container 102 to touch the sidewalls of the container, and thus can have a diameter which is substantially the same as the diameter of the container 102. The liquid absorbing material 104 can alternatively be sized and shaped such that it extends across only a portion of the internal diameter of the container, and thus can have a diameter which is less than the internal diameter of the container 102. The liquid absorbing material 104 is shown in the figures as being spherical in shape, yet other shapes are contemplated such as cylindrical, elliptical, conical, and cubic shapes.

The liquid absorbing material 104 can be a fibrous material which is capable of absorbing liquid. Representative examples of fibrous, liquid absorbing materials include cotton, jute, flax, ramie, kenaf, hemp, bamboo, lyocell, wool, sponge, cardboard, paper fiber, a cellulosic fiber, or a combination thereof. A combination comprising at least one of the foregoing can be used.

The amount of liquid absorbing material 104 provided in the container 102 can be from about 0.1 gram to about 100 grams, about 0.2 gram to about 50 grams, about 0.5 gram to about 25 grams, or about 1 gram to about 12 grams. An embodiment in which the amount of the liquid absorbing material 104 is about 0.5 gram to about 1.5 grams is mentioned. The amount of the liquid absorbing material provided in the container can be more or less than about 1 gram and can vary by more or less than about 40 percent. As can be seen in FIG. 1, the liquid absorbing material 104 can be sized and shaped to occupy between about 50 percent to about 75 percent, about 55 percent to about 70 percent, or about 60 percent to about 70 percent, of the volume of the container. In an embodiment, the liquid absorbing material is sized to occupy about two-thirds (e.g. about 67 percent) of the volume of the container 102.

The descaler 106 can comprise a liquid descaler, a dry powder descaler, or a combination thereof.

Representative examples of a liquid descaler include acetic acid, hydrochloric acid, formic acid, phosphoric acid, butyric acid, and sulfamic acid. The liquid descaler can be an aqueous solution of an acid such as an aqueous solution of acetic acid, hydrochloric acid, formic acid, phosphoric acid, or sulfamic acid. In a preferred embodiment, the liquid descaler is a food-safe ingredient that is not harmful if consumed and which is capable of descaling and/or cleaning the flow passages of the pod-type beverage machine. Acetic acid is specifically mentioned. The liquid descaler can be in the form of an aqueous liquid including at least 4 percent weight per volume (w/v) of free acid. Liquid vinegar is specifically mentioned. The liquid vinegar can include apple cider vinegar, distilled white vinegar, red wine vinegar, white wine vinegar, rice vinegar, balsamic vinegar, malt vinegar, cane vinegar, champagne vinegar, sherry vinegar, fruit vinegar, such as raisin vinegar, kiwifruit vinegar, pomegranate vinegar, any other food grade vinegar, or a combination thereof.

The dry powder descaler can comprise a dry, water-soluble particulate material. In a preferred embodiment, the dry powder descaler is a food-safe ingredient that is not harmful if consumed and which is capable of descaling and/or cleaning the flow passages of the pod-type beverage machine. Representative examples of the dry powder descaler include glycolic acid, citric acid, malic acid, fumaric acid, lactic acid, tartaric acid, ascorbic acid, adipic acid, oxalic acid, succinic acid, sodium acetate, sodium diacetate, potassium acetate, dry powder vinegar, or a combination thereof. Use of a dry powder vinegar is specifically mentioned. The dry powder vinegar can be prepared by spraying vinegar onto a powdered carrier (e.g. a food starch, a modified food starch, etc.) and drying the material to form a dry powder. The dry powder vinegar can also be made by combing acetic acid and at least one of sodium acetate, sodium diacetate, and potassium acetate. The dry powder vinegar can include apple cider vinegar, distilled white vinegar, red wine vinegar, white wine vinegar, rice vinegar, balsamic vinegar, malt vinegar, cane vinegar, champagne vinegar, sherry vinegar, fruit vinegar, such as raisin vinegar, kiwifruit vinegar, pomegranate vinegar, any other food grade vinegar, acetic acid and at least one of sodium acetate, sodium diacetate, and potassium acetate, or a combination thereof.

The descaler can be a synthetic or a natural product.

As shown in FIGS. 1 and 2, the cleaning pod 100 includes a dry powder descaler, such as dry powder vinegar, as the descaler 106. The dry powder descaler can be a flowable powder. The dry powder descaler can also be compressed into a tablet form. A combination of both a flowable powder material and at least one tablet can also be used. The dry powder descaler can be inserted into the container 102 after the liquid absorbing material 104 has been inserted. Accordingly, the liquid absorbing material 104 can be disposed between the dry powder descaler and the bottom wall 110 of the container 102. The dry powder descaler can also be disposed within the container such that it is located below, to the side of, and/or surrounding the liquid absorbing material 104. Alternatively, or in addition to, the dry powder descaler can be added to the container at the same time as the liquid absorbing material, either by adding each material separately at the same time, or by directly adding the dry powder descaler to the liquid absorbing material itself by, for example, interspersing the powder in the fibers of the liquid absorbing material.

An amount of the descaler 106 in the container can be about 0.1 gram to about 100 grams, about 0.2 gram to about 50 grams, about 0.5 gram to about 25 grams, or about 1 gram to about 12 grams, or about 1 gram to about 5 grams. An embodiment in which the amount of the descaler is about 1 gram to about 3 grams is mentioned.

An amount of the dry powder descaler in the container can be from about 1 gram to about 5 grams, about 1.4 grams to about 3.7 grams, about 1.5 grams to about 3.6 grams, or about 2 grams to about 3 grams. In an embodiment, about 2.6 grams of dry powder descaler is added to the container, and can vary by plus or minus 40 percent.

In addition to the descaler, the cleaning pod can also include an aromatic dry powder. The aromatic dry powder can be a water-soluble particulate material. Representative examples of the aromatic dry powder include a natural or synthetic aroma selected from citrus, floral (e.g. lavender), vanilla, mint extracts, or a combination thereof, but are not limited thereto. The amount of aromatic dry powder in the container can be about 0.5 grams to about 2.5 grams, about 0.7 gram to about 2 grams, or about 1 gram to about 3.0 grams.

In certain embodiments, an auxiliary dry powder can also be included in the container 102 in addition to the descaler. Representative examples of the auxiliary dry powder include sodium carbonate, sodium bicarbonate, or a combination thereof. The amount of the auxiliary dry powder can be about 0.5 grams to about 2.5 grams, about 0.7 gram to about 2 grams, or about 1 gram to about 3.0 grams.

The powder agents in the container can consist essentially of, or consist of, the descaler, e.g., the dry powder descaler, and the auxiliary dry powder. In an embodiment, the powder agents consist essentially of, or consist of, a dry powder vinegar and sodium bicarbonate. In another embodiment, the powder agents in the container consist essentially of, or consist of, about 1 gram to about 1.5 grams of a dry powder vinegar and about 1 gram to about 1.5 grams of sodium bicarbonate.

In an embodiment, the container comprises about 1 gram of liquid absorbing material, about 1.3 grams descaler, and about 1.3 grams of auxiliary dry powder.

A cover 108 is disposed over the open top 114 of the container 102. The cover 108 is attached to the sidewall 112 of the container 102. The cover 108 can be applied after the liquid absorbing material 104 and descaler 106 (and any other materials such as dry powder materials) have been added to the container 102. The cover 108 seals closed the open top 114 of the container 102 and prevents the contents inside of the container 102 from prematurely escaping. The cover 108 can be a liquid impermeable material, such as a thin metal foil, plastic, or other suitable material.

A method for descaling flow passage of a pod beverage machine comprises providing the descaling pod; inserting the descaling pod into the beverage machine comprising a first needle and a second needle and causing the first needle to pierce the cover of the descaling pod and the second needle to pierce the bottom wall of the descaling pod; activating the beverage machine wherein the activation causes water to be injected into the pod; dispersing and/or dissolving the descaler in the water to form a descaling solution, wherein at least a portion of the descaling solution is absorbed by the liquid absorbing material; and descaling the first needle and the second needle.

Referring to FIG. 2, the cleaning pod 100 is shown in use during a brewing cycle of a brewing machine. When the cleaning pod 100 is inserted into the beverage machine, a top needle A and a bottom needle B pierce through the cover 108 and the bottom wall 110 of the container 102, respectively, and extend into the interior 116 of the container 102. The cover of the descaling pod and the bottom wall of the descaling pod are pierced by the first and second needles at different times or at the same time. The order in which the piercing of the cover 108 and the bottom wall 110 of the container 102 occurs is immaterial, as long as the cover 108 and the bottom wall 110 are pierced by the first needle and the second needle. Thus, the first needle can pierce the cover and then the second needle can pierce the bottom wall, the second needle can pierce the bottom wall and then the first needle can pierce the cover, or the first needle and the second needle can pierce the cover and the bottom wall, respectively, at the same time.

The top needle A introduces water into the interior 116 of the container. The water can be cold water or hot water, depending upon whether the pod-type beverage machine is designed to prepare hot preparations or cold preparation. Hot water is specifically mentioned. As the water enters the container 102, the descaler 106 (and any other agents, if also included) disperse and/or dissolve into the water to form a cleaning solution (e.g. a descaling solution). At least a portion of the cleaning solution is then absorbed into the liquid absorbing material 104. Since the cleaning solution is absorbed into the liquid absorbing material 104, the liquid absorbing material 104 prevents all of the cleaning solution from immediately exiting the container 102 through the bottom needle B. As additional water is introduced into the container 102 via the top needle A, the liquid absorbing material 104 can become saturated. The liquid absorbing material 104 will then begin to release the cleaning solution that it absorbed over an extended period of time. As water continues to enter the container, the cleaning solution is moved about within the container 102, and contacts the top and bottom needles A and B. Moreover, in certain embodiments, the liquid absorbing material 104 can be sized and shaped and disposed within the container 102 such that the liquid absorbing material 104 contacts the needles A and B upon insertion of the cleaning pod 100 into the beverage machine, thereby increasing the amount of time the needles are in contact with the cleaning solution.

Accordingly, the cleaning solution (e.g., descaling solution) is able to descale and clean both the top and bottom needles. The increased retention time of the cleaning solution within the container increases the contact time between the cleaning solution and the top and bottom needles. The increased contact time improves the cleaning effectiveness of the cleaning solution. The absorption of the cleaning solution by the liquid absorbing material 104 and the delayed release therefrom significantly improves the cleaning and descaling effectiveness.

The use of the liquid absorbing material 104 as described herein provides a significant improvement over cleaning devices that do not include the liquid absorbing material. For example, a container including only dry a cleaning powder without a liquid absorbing material would empty of cleaning solution too quickly to effectively clean and descale the needles. Without a liquid absorbing material, when water is introduced into the container, all of the cleaning solution can leave the container within the first few seconds. All, or substantially all, of the cleaning solution will exit the container within the first ten seconds. Even containers that include a filter basket do not solve this problem because brewing filters are designed to allow liquid to pass through while retaining solids (e.g., coffee grinds). As such, the cleaning solution will pass through the filter material relatively unimpeded and for at least this reason, a "filter" does not satisfy the liquid absorbing properties of the descaling device configured as described herein.

Including a "liquid absorbing material" in a container as disclosed herein causes the cleaning solution to remain within the container for at least five seconds, or for at least 10 seconds, and thus qualifies as an appropriate material and quantity of material. For example, cleaning solution can remain in the container for about 5 to about 500 seconds, about 10 to about 200 seconds, or for about 10 to about 60 seconds. Having the solution remain within the container for about 10 to about 30 seconds is specifically mentioned. This is a significant improvement over designs that lack a liquid absorbing material, whether or not they include a filter. As discussed above, the increased retention time and slow release of the cleaning solution from the absorbing material improves the effectiveness of the cleaning of the needles. The amount, density, composition, and/or material type of the liquid absorbing material can be adjusted to achieve an optimal retention time for cleaning.

Moreover, the use of a dry powder descaler can provide further advantages. Using a dry powder descaler as opposed to a liquid cleaner reduces the weight of the container. Accordingly, this reduces shipping costs and the environmental impact associated therewith. In addition, the dry powder descaler (e.g., dry powder vinegar) can be a food safe ingredient that is not harmful if consumed. If not all of the cleaning solution is flushed from the machine during the cleaning/brewing cycle, a consumer will not be harmed if a vinegar based cleaning solution residue is inadvertently consumed. In contrast, systems that use cleaning chemicals to clean the machine could cause harm to the user if accidently consumed.

The cleaning pod can be manufactured relatively easily on an assembly line, for example. A plastic container 102 can be provided. Then, the liquid absorbing material 104 can be inserted into the container 102. The descaler 106 can then be added into the container. Alternatively, the descaler 106 can be added before or at the same time as the liquid absorbing material. Then, the cover 108 can be applied and sealed. It is also possible to add the descaler directly to the liquid absorbing material itself by, for example, interspersing the descaler in the fibers of the liquid absorbing material.

The cleaning pod 100 shown in FIGS. 1 and 2, has a particular size, shape, construction, and orientation that corresponds to a particular brewing machine. However, there are many different brewing machines, each of which is designed to accommodate pods having a different size, shape, construction, and/or orientation. Accordingly, the size, shape, construction, and/or orientation of the pod can be changed in order to function with different brewing machines without departing from the scope of the present disclosure.

EXAMPLES

The following examples demonstrate the effectiveness of various materials and ingredients. The brand and model of the single-serve brewer used for the tests was a Keurig single-serve brewer, model K60. A Saneu sealing machine, model SA-4 Auto Sealer was also used. The containers (e.g. "Cup") were made of a combination of polystyrene and polypropylene cups and the openings were sealed with corresponding foil lids. (Each Cup includes a compatible foil lid to ensure proper adhesion). The tests were performed over several months on a weekly basis.

Test #1: Apple Cider Vinegar Powder

Materials Used and Source: Apple Cider Vinegar powder purchased from SpiceJungle.com. Swisspers organic cotton balls, a 1 gram pre-spun cotton ball purchased online from an online retailer.

Amounts/Measurements: 2 to 4 grams of Apple Cider Vinegar powder, 1 cotton ball, approximately 1 gram, one Cup and one foil lid.

Method used to perform the test: The 1 gram of cotton was placed into the Cup, the 4 grams of Apple Cider Vinegar powder was added, and the Cup was placed onto the tray of the Saneu sealing machine. A foil lid was placed on top of the Cup and the sealing button was pressed to seal the lid to the Cup. The sealed Cup containing the above materials was then placed in the single-serve brewer receptacle and a clear coffee mug was placed in position to receive fluid exiting from the receptacle. Then handle of the single-serve brewer was pulled down to close the Cup within the receptacle and the start button was pressed to initiate a brewing cycle.

Results: Following the brewing cycle, it was noticed that the coffee mug contained several coffee grinds, the color of the water was discolored, and there were other objects floating in the clear coffee mug. The foil seal was removed from the Cup and several coffee grinds were found inside the cup and a light brown discoloration of the cotton ball inside the Cup was observed. There was some residual powder in the Cup so the test was conducted several times, using decreasing amounts of Apple Cider Vinegar, until we arrived at 2.6 grams of Apple Cider Vinegar powder with no powder residue present in the Cup after the test.

Test #2: Apple Cider Vinegar Powder and Baking Soda

Materials Used and Source: Apple Cider Vinegar powder purchased from SpiceJungle.com. Baking soda powder purchased from local grocery store. Swisspers organic cotton balls, 1 gram pre-spun cotton balls purchased online from an online retailer.

Amounts/Measurements: 2.6 grams of Apple Cider Vinegar powder, 0.40 grams of Baking Soda powder, 1 cotton ball (approximately 1 gram), one Cup, and one foil lid.

Method used to perform the test: The 1 gram of cotton was placed into the Cup, the 2.6 grams of Apple Cider Vinegar powder and 0.40 grams of Baking Soda powder were added, and the Cup was placed onto the tray of the Saneu sealing machine. A foil lid was placed on the open top of the Cup and the sealing button was pressed to seal the lid to the Cup. The sealed Cup, with the above contents in it, was placed in the single-serve brewer receptacle and a clear coffee mug was placed in position below the receptacle to receive fluid exiting from the receptacle. The handle of the single-serve brewer was pulled down to close the Cup within the receptacle and the start button was pressed to initiate a brewing cycle.

Results: Immediately following the brewing cycle, a lot of foam was observed in the clear coffee mug. There were only a few coffee grinds and the color of the water was white due to the baking soda. There was some baking soda powder that did not dissolve completely and the residual was present in both the Cup and the coffee mug. The quantity of baking soda was adjusted several times, however, we still ended up with some foam from the baking soda in the clear coffee mug. The foil seal was removed from the Cup and coffee grinds and foam from the baking soda powder were found inside of the Cup.

Test #3: Apple Cider Vinegar Powder and Citric Acid

Materials Used and Source: Apple Cider Vinegar powder and citric acid purchased from SpiceJungle.com. Swisspers organic cotton balls, 1 gram pre-spun cotton balls purchased online from an online retailer.

Amounts/Measurements: 2.6 grams of Apple Cider Vinegar powder, 0.040 grams of Citric Acid, 1 cotton ball (approximately 1 gram), one Cup, and one foil lid.

Method used to perform the test: The 1 gram of cotton was placed into the Cup, and then the 2.6 grams of Apple Cider Vinegar powder, and 0.40 grams of Citric Acid powder were added to the Cup. The Cup was placed onto the tray of the Saneu sealing machine. A foil lid was placed on the opening at the top of the Cup and the sealing button was pressed to seal the lid to the Cup. The sealed Cup, containing the above materials, was placed in the single-serve brewer receptacle and a clear coffee mug was placed in position below the receptacle to receive fluid exiting from the receptacle. The handle of the single-serve brewer was pulled down to close the Cup within the receptacle and the start button was pressed to initiate a brewing cycle.

Results: Following the brewing cycle, several coffee grinds were observed floating in the water and at the bottom of the clear coffee mug. There was a light brown discoloration of the water as well. There was no residual powder remaining in the Cup. A cup of coffee was brewed afterward to determine whether or not there was an after taste. There was none. The cleaning and brewing steps were repeated several times using brewed tea and hot chocolate, and there was no residual aftertaste associated with the Apple Cider Vinegar or the citric acid. The foil seal was removed from the Cup and several coffee grinds were found that had been trapped by the cotton, and a light brown discoloration of the cotton ball inside the Cup was observed.

Test #4: Distilled White Vinegar Powder

Materials Used and Source: Distilled White Vinegar powder purchased from SpiceJungle.com. Swisspers organic cotton balls and 1 gram pre-spun cotton balls purchased online from an online retailer.

Amounts/Measurements: 2.6 grams of Distilled White Vinegar powder, 1 cotton ball (approximately 1 gram), one Cup and one foil lid.

Method used to perform the test: The 1 gram of cotton was placed into the cup and 2.6 grams of Distilled White Vinegar powder was added. The Cup was placed onto the tray of the Saneu sealing machine. A foil lid was placed on the opening at the top of the Cup and the sealing button was pressed to seal the lid to the Cup. The sealed Cup, containing the above materials, was placed in the single-serve brewer receptacle and a clear coffee mug was placed in position below the receptacle to receive fluid exiting from the receptacle. The handle of the single-serve brewer was pulled down to close the Cup within the receptacle and the start button was pressed to initiate a brewing cycle.

Results: Again, following the brewing cycle, several coffee grinds were observed floating and at the bottom of the clear coffee mug. The color of the water was clear this time. The foil seal was removed from the Cup and several coffee grinds were found that the cotton had trapped inside. There was no residual powder left over in the Cup.

Test #5: Distilled White Vinegar Powder and Baking Soda

Materials Used and Source: Distilled White Vinegar powder purchased from SpiceJungle.com. Baking soda powder was purchased from local grocery store. Swisspers organic cotton balls, 1 gram pre-spun cotton balls, were purchased online from an online retailer.

Amounts/Measurements used: 2.6 grams of White Distilled Vinegar powder, 0.40 baking soda powder, 1 cotton ball, approximately 1 gram, one Cup and one foil lid.

Method used to perform the test: The 1 gram of cotton was placed into the Cup and then 2.6 grams of Distilled White Vinegar, and 0.40 grams of baking soda powder was added. The Cup was placed onto the tray of the Saneu sealing machine. A foil lid was placed on the opening at the top of the Cup and the sealing button was pressed to seal the lid to the Cup. The sealed Cup, containing the above materials, was placed in the single-serve brewer receptacle and a clear coffee mug was placed in position below the receptacle to receive fluid exiting from the receptacle. The handle of the single-serve brewer was pulled down to close the Cup within the receptacle and the start button was pressed to initiate a brewing cycle.

Results: Following the brewing cycle, the same results were observed as in Test #3 (the Apple Cider Vinegar and baking soda); a lot of foam in the clear coffee mug. There were only a few coffee grinds in the clear coffee mug and the color of the water was white due to the baking soda. There was some baking soda powder as well. The quantity of baking soda was adjusted several times, however we still ended up with some foam from the baking soda. The foil seal was removed from the Cup and coffee grinds and foam from the baking soda powder were found inside.

Test #6: Distilled White Vinegar Powder and Citric Acid

Materials Used and Source: White Distilled Vinegar powder and Citric Acid powder purchased from SpiceJungle.com. Swisspers organic cotton balls, 1 gram pre-spun cotton balls purchased online from an online retailer.

Amounts/Measurements: 2.6 grams of Distilled White Vinegar powder, 0.40 citric acid powder, 1 cotton ball (approximately 1 gram), one Cup, and one foil lid.

Method used to perform the test: The 1 gram of cotton was added into the Cup, and then 2.6 grams of Distilled White Vinegar, and 0.40 grams of Citric Acid powder was added to the Cup. A foil lid was placed on the opening at the top of the Cup and the sealing button was pressed to seal the lid to the Cup. The sealed Cup, containing the above materials, was placed in the single-serve brewer receptacle and a clear coffee mug was placed in position below the receptacle to receive fluid exiting from the receptacle. The handle of the single-serve brewer was pulled down to close the Cup within the receptacle and the start button was pressed to initiate a brewing cycle.

Results: Following the brewing cycle, we noticed several coffee grinds, a light brown discoloration of the water and other objects floating in the cup. There was no powder residue. We removed the foil lid from the Cup and again noticed several coffee grinds and a light brown discoloration of the cotton inside.

It should be understood that various combinations, alternatives, and modifications of the present disclosure could be devised by those skilled in the art. The present invention is intended to embrace all such alternatives, modifications, and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

It will be understood that when an element is referred to as being "on" another element, it can be directly on the other element or intervening elements may be present there between. In contrast, when an element is referred to as being "directly on" another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A device for descaling flow passages of a pod-type beverage machine, the device comprising:
    a container having a bottom wall and a sidewall extending from the bottom wall, the sidewall defining an opening at a top of the container, wherein the container is configured to be received by the beverage machine;
    an absorbent material disposed within the container and adjacent to the bottom wall;
    a descaler disposed within the container, wherein at least a portion of the descaler is disposed on a surface of the absorbing material opposite the bottom wall; and
    a cover over the opening at the top of the container and configured to seal the absorbent material and the descaler in the container,
    wherein the absorbent material occupies between 50 percent to 75 percent of a total volume of the container.

2. The device of claim 1, wherein the absorbent material is configured to retard a flow of liquid through the container.

3. The device of claim 1, wherein the absorbent material comprises cotton, jute, flax, ramie, kenaf, hemp, bamboo, lyocell, wool, sponge, cardboard, paper fiber, or a combination thereof.

4. The device of claim 1, wherein the descaler comprises a dry powder descaler.

5. The device of claim 4, wherein the dry powder descaler comprises sodium acetate, sodium diacetate, potassium acetate, or a combination thereof.

6. The device of claim 1, further comprising an aromatic dry powder.

7. The device of claim 6, wherein the aromatic dry powder comprises an aroma selected from citrus, floral, vanilla, mint, or a combination thereof.

8. The device of claim 1, wherein an amount of the absorbent material is about 0.6 grams to about 1.4 grams.

9. The device of claim 1, wherein an amount of the descaler is about 1 gram to about 3 grams.

10. The device of claim 1, wherein the absorbent material is configured within the container such that the absorbent material contacts a needle of the brewing machine upon insertion of the device into the beverage machine.

11. The device of claim 10, wherein the needle comprises a first needle which punctures the bottom wall of the container, a second needle which punctures the cover over the opening at the top of the container, or combination thereof.

12. The device of claim 1, further comprising an auxiliary dry powder selected from sodium carbonate, sodium bicarbonate, or a combination thereof.

13. The device of claim 12, wherein an amount of the auxiliary dry powder is about 0.5 to about 2 grams.

14. The device of claim 1, wherein the absorbent material occupies between about 60 to about 70 percent of a total volume of the container.

15. A method of descaling flow passages of a pod beverage machine, comprising:
providing a descaling pod, comprising:
a container having a bottom wall and a sidewall extending from the bottom wall, the sidewall defining an opening at a top of the container, wherein the container is configured to be received by the beverage machine;
an absorbent material disposed within the container adjacent to the bottom wall, wherein the absorbent material is configured to retard the flow of water therethrough, wherein the absorbent material occupies between 50 percent to 75 percent of a total volume of the container;
a descaler disposed within the container, wherein at least a portion of the descaler is disposed on a surface of the absorbing material opposite the bottom wall; and
a cover over the opening of the container;
inserting the descaling pod into the beverage machine comprising a first needle and a second needle, and causing the first needle to pierce the cover of the descaling pod and the second needle to pierce the bottom wall of the descaling pod;
activating the beverage machine, wherein the activation causes water to be injected into the pod through the first needle;
dissolving the descaler in the water to form a descaling solution, wherein at least a portion of the descaling solution is absorbed by the absorbent material; and
descaling the first needle and the second needle.

16. The method of claim 15, wherein the cover of the descaling pod and the bottom wall of the descaling pod are pierced by the first needle and the second needle, respectively, at a different time or at a same time.

17. The method of claim 15 further comprising, saturating the absorbent material and releasing the portion of the descaling solution absorbed by the absorbent material.

18. The method of claim 15, wherein the descaling solution is retained in the container for at least about 10 seconds.

19. The method of claim 15, wherein the portion of the descaling solution is retained in the container for about 10 to about 30 seconds.

20. The method of claim 15, wherein the absorbent material occupies between about 60 to about 70 percent of a total volume of the container.

* * * * *